May 14, 1957 C. K. RUDDOCK 2,792,274
SELF-CHARTING COMPASS AND AUTOMATIC NAVIGATIONAL INSTRUMENT
Filed Oct. 28, 1952 2 Sheets-Sheet 1
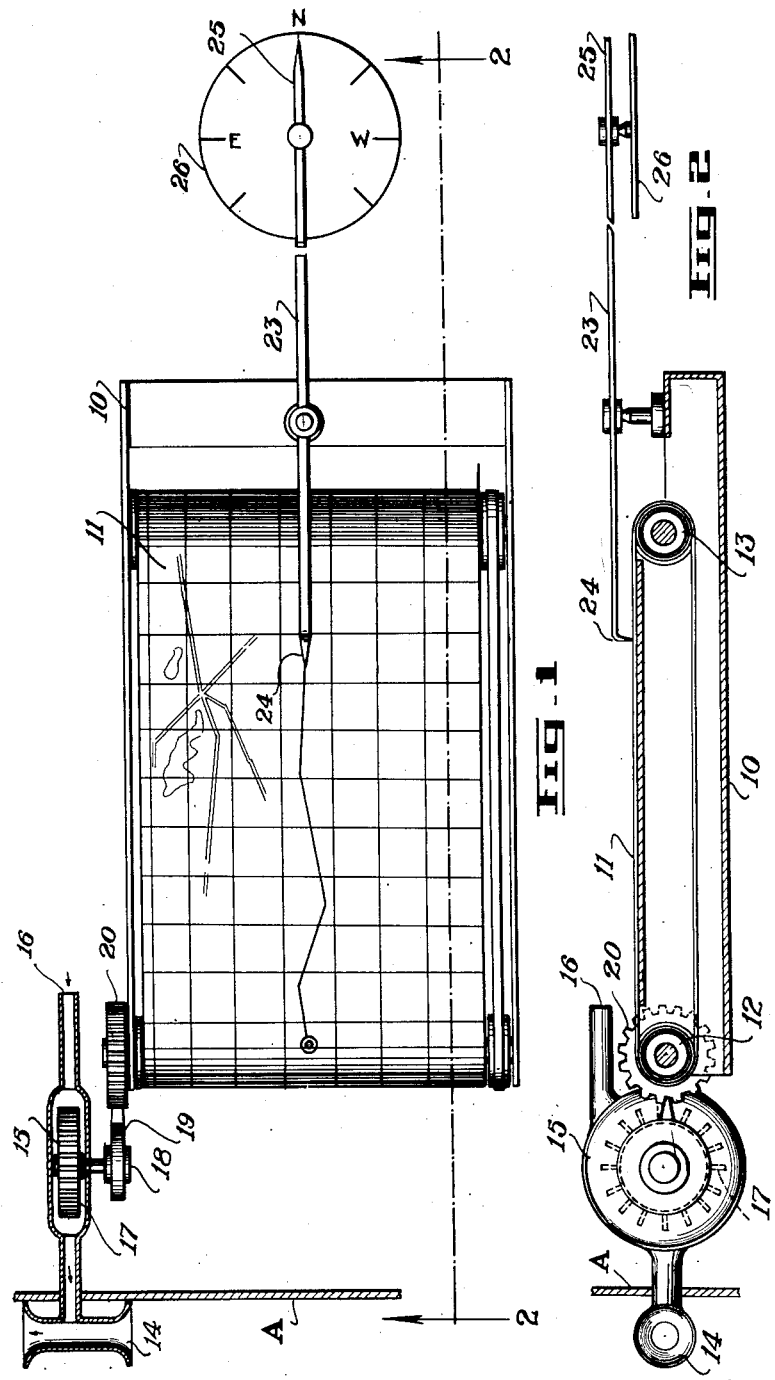
INVENTOR
Charles K. Ruddock
Ralph Burch
ATTORNEY.

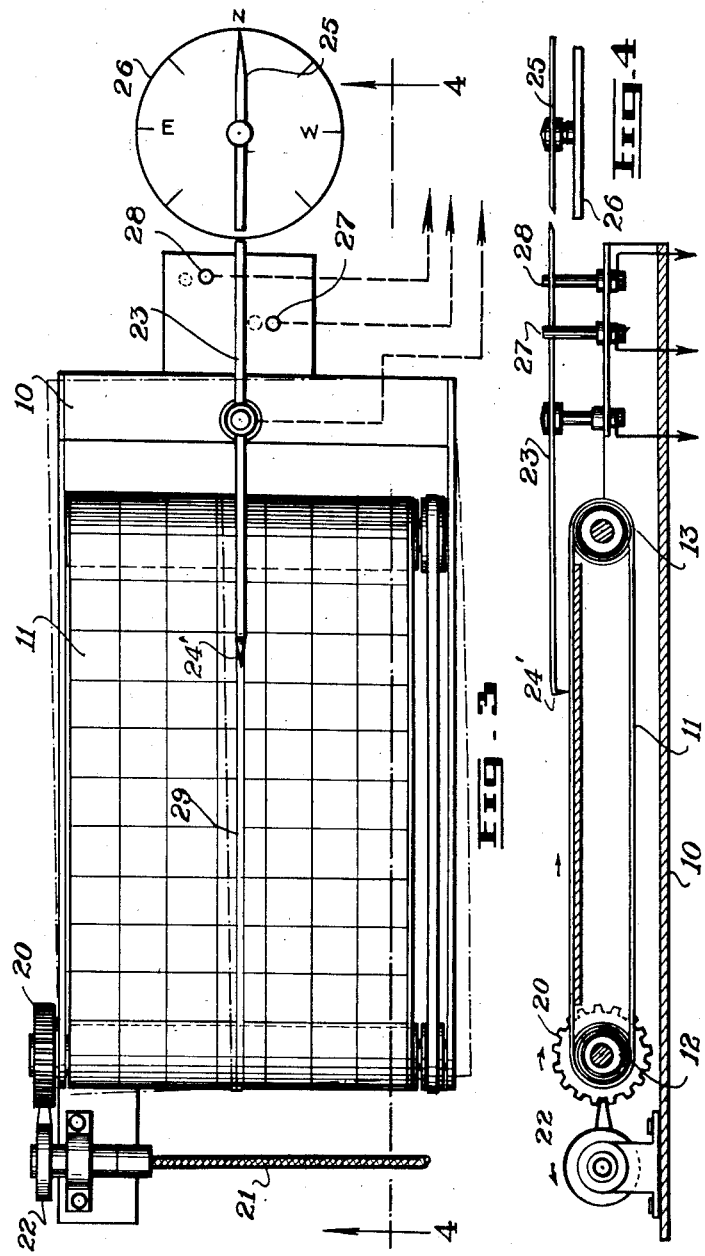

United States Patent Office 2,792,274
Patented May 14, 1957

2,792,274
SELF-CHARTING COMPASS AND AUTOMATIC NAVIGATIONAL INSTRUMENT

Charles K. Ruddock, Windsor, Ontario, Canada

Application October 28, 1952, Serial No. 317,174

3 Claims. (Cl. 346—8)

This invention relates to navigational instruments and particularly to a mechanism for plotting the position of a land, sea, or air conveyance at any instant during passage, and for forming a permanent record of the course travelled by the said conveyance.

According to the present invention, a map or chart is automatically turned in conformity with variations in compass bearings and is moved in timed relation with movement of the land, sea, or air conveyance such that the map or chart is moved past a given point in a direction opposite to the direction of travel of the conveyance at a rate proportional to latter's speed of passage.

Further, according to the present invention, the map or chart is either continuously or intermittently marked to make a permanent record thereon of the position of the point about which it is moved so that not only will it be possible to observe the position of the conveyance at any time but a permanent course record will be obtained.

Still further, according to a modification of this invention, the map or chart is turned or moved to provide for automatic navigation over a predetermined course.

The apparatus consists of a map or chart which is revolubly mounted on a frame secured to the frame of the conveyance in adjustable relationship with a magnetic compass, means for causing linear movement of the chart or map at a rate proportional to the speed of the conveyance through the medium, and means for marking the map in conformity with variations in the compass bearings, said last mentioned means conveniently comprising a magnetic element pivotally mounted on the said frame and adapted for marking the map or chart.

The apparatus according to the modification of this invention comprises the aforesaid apparatus, a magnetized steel ribbon secured to the chart or map in conformity with a predetermined course, the said pivotally mounted magnetic element, and electric switching means actuable by the magnetic element for controlling the direction controlling means usually mounted on the conveyance.

With these and other objects in view which may appear while the description proceeds the invention consists in the novel arrangement of cooperating parts shown in the accompanying drawings forming part of this application and in which:

Figure 1 is a plan view of one embodiment of the invention useable in an air conveyance;

Figure 2 is a section taken on the line 2—2 of Fig. 1;

Figure 3 is a plan view of a modification adapted for automatically directing a sea conveyance along a predetermined course, and Figure 4 is a section taken on the line 4—4 of Fig. 3.

Referring now to the drawings, wherein like reference characters denote like parts throughout, a map or chart supporting frame 10 is mounted in a convenient horizontal position in the frame of a land, sea, or air conveyance, preferably in a position readily visible to the navigator.

Revolubly mounted on the frame 10 is an endless map or chart 11 which is passed over and around suitable revolubly coupled rollers 12 and 13, of which 12 is arranged to be driven such that the map or chart 11 is linearly moved at a rate proportional to the speed of the conveyance through its medium; suitable driving means therefor being provided. In the arrangement of Fig. 1 of the drawings, for example, a venturi tube 14 is secured to the outer side of the fuselage of an air conveyance generally designated at A and is communcatively connected to the housing of a suitable air turbine 15 disposed within the conveyance in a manner such that the air stream along the fuselage A causes a low pressure area within the said turbine. Air rushing into the housing through an inlet passage 16, to neutralize the low pressure area, causes the rotor 17 of the turbine 15 to rotate. Extending from the rotor 17 is an axial shaft 18 which is provided with terminal means, e. g. a gear wheel 19, for revolubly driving a corresponding terminal member 20 secured to the roller 12. In the case of a sea conveyance, the turbine 15 would be replaced by suitable driving means actuated from or by a ship's log as shown in Fig. 3 of the drawings, wherein a log line 21 is revolubly coupled to a terminal driving member 22 corresponding to the gear wheel 19. While not specifically illustrated, it is apparent nevertheless that the chart 11 may be caused to revolve by any suitable speed measuring meter carried in a conveyance useable on land. For example, in Fig. 3 of the drawings, 21 may be a drive cable in communication with the usual speedometer mechanism of a motor car.

Pivotally secured to the opposite end of the frame 10 is a balanced elongated magnetic element or needle 23 having a suitable terminal marker 24 such as a pencil, which marker is disposed over the point of origin of the journey prior to departure. The needle 23 is disposed in line with and adjacent to the needle 25 of a magnetic compass 26 having usual North-South indices and transposed East-West markings inasmuch as the direction of movement of the map or chart 11 is maintained opposite to the direction of movement of the said conveyance. While one needle only need be supplied, the aforesaid arrangement is illustrative of one means of providing compass markings and magnification of the magnetic forces acting on the needle 23, which magnification is desirable for stabilization of the last said needle.

It is evident that the marker 24 must be placed over and on the point of origin of the journey and that the map or chart 11 and the needles 23 and 25 must be correctly oriented, i. e. they must have the same magnetic bearing, at the commencement of the journey. If now movement of the map or chart 11 is maintained opposite to the movement of the conveyance and at a rate proportional to the speed of the conveyance, the course of the said conveyance will be traced on the said map or chart, or on suitable covering placed thereover, and the approximate position and the compass bearing of the said conveyance will be exhibited at all times during the journey.

In the modification of the Figures 3 and 4, the arrangement of the supporting frame 10, map or chart 11, and compass magnetic needles 23 and 25 is essentially the same as the compass needles in Fig. 1 excepting that the marker 24 of needle 23 is replaced by a soft iron or steel pointer 24'. In addition the needle 23 is arranged to act as the moving element of an electric switch; suitable fixed contacts 27 and 28 being disposed on opposite sides of the leading end of needle 23. The needle 23 and fixed contacts 27 and 28 are communicatively connected to external electric means for controlling the usual means for directing the course of the conveyance. It is evident that other and separate means operable by the needle 23 may be provided for actuating the said external electric means; a capacitor relay being one such example.

Disposed on the map or chart 11 in the path of a predetermined course is a flexible elongated magnetically sensitized member 29 the purpose of which will be more fully understood from the succeeding description.

If the map or chart 11 and the needles 23 and 25 are oriented as previously described, and the pointer 24' is brought over and adjacent the point of origin of the planned journey and hence the point of origin of the sensitized strip 29, the said pointer will be influenced by the magnetic field of the said sensitized strip. The strip of magnetic material 29 is built in and on the chart 11 and is movable with the chart so that as the chart is moved over the rollers 13 and 12, the strip 29 also moves with the chart. Any movement of the craft or vessel on which the navigating chart and its equipment is installed will result in movement of the chart and magnetic strip. The strip of magnetic material 29 shows the course which will be followed if no deviation of the craft from the charted course takes place.

The needles 25 and 23 point to the magnetic north and while the direction of these needles is not altered by the craft deviating from the charted course these needles will under such circumstances assume a position of approximate parallelism.

When the craft goes off course the chart and magnetic strip 29 are moved so that the tip 24' of the needle 23 is not over the magnetic strip 29 but is positioned laterally thereto.

When the pilot brings the vessel or craft back on course then the needles 25 and 23 which still point to the magnetic north assume their original normal position in which they are in alinement.

During the return of the craft to its true course there is a magnetic pull between the adjacent ends of the needles 25 and 23 and there is also a magnetic pull between the tip 24' of the needle 23 and the magnetic strip 29. This constitutes a magnetic couple which stabilizes and assists in maintaining the needles 23 and 25 in alinement and so eliminates any tendency of fluctuation.

There are certain conditions which may contribute to put the craft off course and these may be stated broadly as weather and wind conditions and local magnetic disturbances. All or any of these conditions may tend to put the craft off course and break the straight line of the magnetic strip 29, the point 24' and the needles 23 and 25. The first two of these conditions namely weather and wind might cause a craft to go off course and should this happen then the craft only will be effected and will veer but the compass needles 25 and 23 will still point to the magnetic north, and the reading of the compass card 26 will show the true alteration in the course of the craft.

As the craft veers the navigating instrument including the frame 10 on which the chart 11 is mounted and the magnetic strip 29 carried by the chart will as a unit change position relatively to the direction of the magnetic needles 25 and 23 and this veering movement will tend to pull the magnetic strip 29 and the point 24' apart so that the point 24' will be positioned laterally off the magnetic strip 29 and the alinement of the magnetic strip 29, the point 24' and the needles 23 and 25 will be broken.

If the veering of the craft has not been corrected by the pilot of the craft then the continued veering will bring the end of the needle 23 into contact with either of the electrical contacts 28 or 27, thus closing the electric circuit and starting a motor to operate the rudder to bring the craft back on course. This automatic control is very important should the craft be weathering a gale and tending to yaw.

The condition of local magnetic disturbances referred to above will not affect the craft but they may tend to disturb the needles 25 and 23 but the magnetic couple between the strip 29 and the point 24' of the needle 23 will tend to keep the needles in true position so that these local magnetic disturbances will be dampened out. These local magnetic disturbances must not be confused with terrestrial magnetism and it is only these local disturbances which my magnetic couple counteracts.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the construction, combination and arrangement of cooperating parts may be resorted to within the scope of what is claimed without departing from the spirit of the invention.

I claim:

1. A navigational recording instrument for conveyances comprising a supporting frame fixedly attached to the conveyance, a movable chart mounted on said frame for movement in a direction at right angles to the direction of movement of the conveyance, a magnetic needle pivotally mounted on one end of said frame in line with the movement of said chart having at its trailing end a terminal marker in engagement with the surface of the chart and movable thereon in a horizontal plane, a second magnetic needle mounted in spaced apart relation to said frame having its needle normally disposed in alignment with said first mentioned magnetic needle with its trailing end adjacent the leading end of the first magnetic needle, and means for moving said chart in proportion to the speed of the conveyance.

2. A navigational recording instrument for conveyances comprising a supporting frame fixedly attached to the conveyance, a movable chart mounted on said frame for movement in a direction at right angles to the direction of movement of the conveyance, a flexible magnetic strip mounted longitudinally in the center of said chart, a magnetic needle pivotally mounted at one end of said frame in a horizontal plane with its trailing end disposed over said chart and having a terminal marker in engagement with the surface of the chart, a second magnetic needle mounted in spaced apart relation to said frame having its needle normally disposed in alinement with said first magnetic needle with its trailing end adjacent the leading end of said first magnetic needle and means for moving said chart in proportion to the speed of the conveyance.

3. A navigational recording instrument for conveyances of the character described in claim 2 including an electric control circuit having circuit closing contacts disposed on opposite sides of the leading end of said first magnetic needle for engagement therewith upon movement of the needle.

References Cited in the file of this patent

UNITED STATES PATENTS

| | | |
|---|---|---|
| 472,124 | Jaeger | Apr. 5, 1892 |
| 813,933 | Abraham | Feb. 27, 1906 |
| 994,677 | Hennah et al. | June 6, 1911 |
| 2,163,746 | Courtois-Suffit et al. | June 27, 1939 |
| 2,449,283 | Dike et al. | Sept. 14, 1948 |
| 2,637,618 | Ray | May 5, 1953 |